Patented Mar. 9, 1943

2,313,565

UNITED STATES PATENT OFFICE 2,313,565

RESIN AND ITS PREPARATION

Wendell H. McDowell and William O. Kenyon, Rochester, N. Y., assignors to Eastman Kodak Company, Rochester, N. Y., a corporation of New Jersey No Drawing. Application October 31, 1939,
Serial No. 302,208

4 Claims. (Cl. 260—78)

This invention relates to resins comprising the imide of acid anhydride containing resins. These may be prepared by polymerization of polymerizable unsaturated compounds with the imide of the acid anhydride or by treating a resin containing acid anhydride groups with ammonia or primary or secondary amines so as to form the imide directly or subsequently subjecting the resulting product to the action of a ring closing compound such as acetic anhydride.

Often in the resin art products are obtained which appear to have good qualities but their usefulness is impaired because of poor stability. This invention relates to resins of good stability which are useful for the preparation of sheeting and photographic film, as well as intermediate products which are suitable for use as antihalation backings, protective coatings, filter layers, etc.

We have found that a resin of good stability is obtained by reacting upon a maleic anhydride-vinyl ethyl ether resin with ammonia or an aliphatic or aromatic amine and subsequently treating with an acid anhydride such as acetic anhydride at an elevated temperature. We have found that resins having good physical properties are obtained by the reaction of the amine upon a resin containing in its make up an acid anhydride group.

We have also found that the imide resins of our invention may be prepared by heating the imide of an acid anhydride with a polymerizable unsaturated compound such as vinyl-ethyl ether and a catalyst promoting this reaction such as benzoyl peroxide. The reaction which takes place in the case of maleinimide may be represented by the following equation:

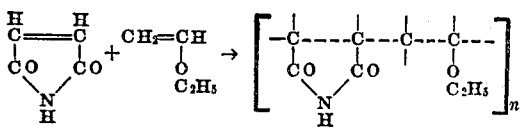

In the case of using a resin composed of a polycarboxylic anhydride combined with a vinyl compound such as a vinyl ethyl ether or vinyl acetate from which the imide is produced, the action producing the imide may be represented by the following equation using ammonia to form the amide product:

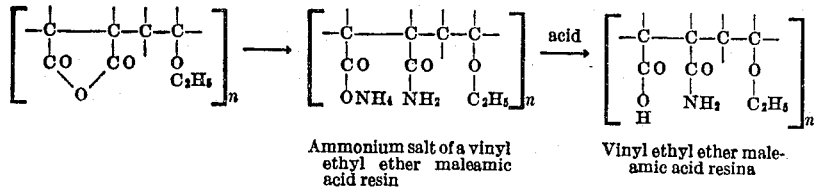

Ammonium salt of a vinyl ethyl ether maleamic acid resin

Vinyl ethyl ether maleamic acid resina

By treatment of the amic acid resin with acetic anhydride the imide is formed.

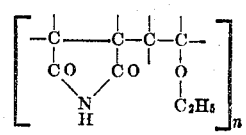

With the use of a high temperature such as approximately 100° C. the formation of the imide may take place directly without using acetic anhydride to close the ring. In the preparation of some of the maleamic acid resins such as those derived from aniline, we have found that dioxan makes an excellent reaction medium and in the case of the maleic anhydride-vinyl acetate resin, reaction with aniline can take place at room temperature. Other amines such as alkylamines substituted anilines, urea, amino acids, hydrazines, etc. may be employed.

Some of the acid anhydrides, the resins of which have been employed to make products in accordance with our invention, are polyacrylic acid anhydride, and maleic anhydride. It is believed that these examples are representative of acid anhydrides which form resins suitable for the preparation of imide resins by reacting with amines or ammonia in accordance with the equation given above. The resins constituted by the polymers or copolymers of the anhydrides of $\alpha$ $\beta$ dicarboxylic acids such as itaconic can also be used in forming the imide type resins. The reaction results in the ammonia or amine salt of the anhydride containing resin. By treatment with acid this salt is converted to an amic acid resin. As pointed out, with the use of strong conditions the imide may be directly formed in this step without the necessity of using a ring closing compound.

The following examples illustrate the preparation of resin imides in accordance with our invention.

Examples 8 and 9 illustrate the formation of an imide resin by using an imide compound as the starting material.

Example 1

25 grams of polyacrylic acid anhydride resin was mixed with 130 gm. of aniline and heated at 75° C. for 10 minutes. The mass was diluted with an equal volume of methyl alcohol and precipitated into dilute aqueous hydrochloric acid. The resin so obtained was soluble in dilute alkali and contained 6.4% nitrogen.

20 grams of the product were heated with 150 cc. of acetic anhydride for ten minutes at the boiling point of the mass. The mixture was precipitated in water and the resin which separated was purified by dissolving in acetone and precipitating in water. The resin was found to be insoluble in dilute alkali and to contain 5.3% nitrogen.

The same imide resin was prepared also in a more direct manner by heating the polyacrylic acid anhydride resin with aniline under anhydrous conditions at approximately 100° C. An imide resin of the same type as above but containing more combined nitrogen was obtained.

Example 2

100 grams of polyacrylic acid anhydride resin were heated with 520 grams of aniline at 110° C. for 25 minutes. After dilution of the acid mixture with acetone it was precipitated into dilute hydrochloric acid. The resin which is separated was soluble in alkali and common organic solvents.

One hundred grams of the resin were suspended and heated with 500 cc. of commercial 85% acetic anhydride for fifteen minutes at its boiling point and an alkali-insoluble material was obtained. One liter of water was added to the mixture and the mass was heated at 100° C. for one hour. The liquor was decanted off and the resin which remained was dissolved in 500 cc. of warm pyridine and then precipitated in dilute aqueous hydrochloric acid, an imide resin resulting.

Example 3

25 grams of a styrene-maleic anhydride resin containing 15.8% of combined maleic acid, 29.5% of combined maleic anhydride and 54.7% combined styrene, were placed in 200 cc. of aniline and heated at 100° C. for sixteen hours. The reaction mixture was diluted with acetone and precipitated into dilute hydrochloric acid. The resin was washed until free of acids and salts. The styrene-phenylmaleinimide resin so obtained was soluble in acetone and insoluble in alkali.

Example 4

This example illustrates the preparation of an imide resin by the low-temperature method. 450 grams of the maleic anhydride-vinyl ethyl ether resin (55.3% maleic anhydride, 0.4% maleic acid, 44.3% vinyl ethyl ether) were dissolved in 7500 cc. of acetone and heated with 930 grams of freshly distilled aniline for one and a half hours at its boiling point. The resin formed was purified by precipitating in dilute hydrochloric acid. A vinyl-ethyl ether maleanilic acid resin resulted.

100 grams of the resin were heated at 100° C. with 700 cc. of 95% acetic anhydride, until the resin had become insoluble in dilute alkali. The product (vinyl ethyl ether-phenyl maleinimide) was isolated by precipitating from acetone. The nitrogen content of the resin was approximately 4.9%.

Example 5

Two hundred grams of the styrene-maleic anhydride resin, (55.8% maleic anhydride, 44.2% styrene), were dissolved in 1600 cc. acetone and treated with 413 gm. of aniline at room temperature. After four hours the cherry-red colored solution was precipitated in dilute hydrochloric acid and the resin was washed in the usual manner.

One hundred grams of the styrene-maleic anhydride resin formed were heated with 700 cc. of 95% acetic anhydride for five hours at approximately 100° C. The excess acetic anhydride was decomposed with water and the precipitated resin was purified in the customary manner. The resin which contained approximately 3.3% nitrogen was soluble in acetone and ethylene chloride-methanol and insoluble in dilute alkali.

Example 6

Two hundred grams of the styrene-maleic anhydride resin were dissolved in 1600 cc. of acetone and treated with 150 grams of cyclohexylamine in 200 cc. acetone. The cyclohexylamine salt of the styrene-cyclohexyl maleamic acid resin which precipitated was separated by filtration and dried. 100 grams of this product were heated with 700 cc. of commercial acetic anhydride for one hour at 100° C. The excess anhydride was decomposed with hot water and the resin which separated was purified by precipitating from acetone. The nitrogen content of the styrene-cyclohexylmaleinimide resin obtained was approximately 4%. It was soluble in common organic solvents and insoluble in dilute alkali.

Example 7

Five grams of maleic anhydride-vinyl acetate resin (45% maleic anhydride, 11% maleic acid, 44% vinyl acetate) were dissolved in 50 cc. of acetone and were then treated with 25 cc. of acetone containing 6 cc. of n-butylamine. The reaction was exothermic and, as it proceeded, a granular resinous precipitate was formed. Instead of acetone, dioxan might be employed as the solvent.

After decantation of the liquid from the resin it was dried in a stream of air.

Five grams of the vinyl acetate-butyl maleamic acid resin prepared were esterified as follows:

The resin was dissolved in 40 cc. of $n$-butyl alcohol to which 0.8 cc. concentrated sulfuric acid had been added and the mixture was heated over a steam bath for twenty-four hours. The mass was diluted with acetone and the resin was precipitated into water. The product contained 2.25% nitrogen and was insoluble in dilute alkali. The resin could be dissolved in organic liquids such as acetone and coated out in the form of skins or sheets.

Example 8

Nineteen grams of benzyl maleinimide having a melting point of 67° C. were polymerized with 10 grams of vinyl ethyl ether using .016 gram of benzoyl peroxide as the catalyst. The resin was purified by precipitating from acetone solution into carbon tetrachloride. The resulting resin which was vinyl ethyl ether-n-benzyl maleinimide, was soluble in benzene and contained approximately 5.6% nitrogen.

*Example 9*

Ten grams of benzyl maleinimide were polymerized with 6 grams of vinyl acetate using .008 gram of benzoyl peroxide catalyst in the presence of heat. The vinyl acetate-benzyl maleinimide formed was purified by precipitating from acetone into carbon tetrachloride. The resin contained approximately 6% of nitrogen and was soluble in acetone.

*Example 10*

Two hundred grams of the methylmethacrylate-maleic anhydride resin containing 20% methoxyl were dissolved in 1600 cc. of dry acetone. 160 grams of n-butylamine were added and the mixture was allowed to stand at room temperature for two hours. The resin was precipitated from solution by diluting the dope with acetone and pouring into a large volume of water. The resin was insoluble in dilute alkali.

This methyl methacrylate-n-butyl maleamic acid resin may be treated with acetic anhydride to close the ring and thus yield the corresponding imide resin.

The imide resins prepared in accordance with our invention may be employed for preparing sheeting or film base by dissolving in a low boiling organic solvent and flowing out on to a film forming surface under evaporative conditions.

The imide resins disclosed herein may if desired be employed to prepare textile fibers such as by evaporative spinning or for use as the principal constituent of molding powders to facilitate the preparation of molded products. It may also be employed for impregnating or waterproofing textiles, paper etc.

The maleamic type resins disclosed herein are useful for use where a coating soluble in an alkaline solution is desired such as backings or anti-halation layers for photographic films, overcoatings and interlayers for use on materials upon which such treatment is desired.

If desired urea may be reacted with the product resulting from the reaction of a maleic anhydride-vinyl acetate resin with an amine. A colorless water-soluble product is thereby obtained.

In our process in which ammonia or an amine is reacted with an organic acid anhydride-containing resin, other mineral acids than hydrochloric, such as sulfuric or phosphoric, may be employed to treat the product to convert it to the amic acid resin. The dilution of the mineral acid is not critical however. A solution of 5% HCl in water has been found to be quite suitable in most cases for converting the ammonium salt to the amic acid resin.

Example 3 illustrates that the time of treatment to close the ring and form the imide is considerably longer at an elevated temperature than that necessary for the reaction of the amine or ammonia and the anhydride resin. Accordingly, it is usually preferred to use a lower fatty acid anhydride such as acetic anhydride for the purpose of closing the ring. Example 5 illustrates that the reaction between an anhydride containing resin and an amine or ammonia will take place at ordinary temperatures, the time being longer for the reaction to occur.

We claim:

1. A method of preparing a resin which comprises reacting, in an inert organic solvent, upon a synthetic resin containing as an essential ingredient thereof an organic acid anhydride of an $\alpha\beta$-unsaturated dicarboxylic acid with a base selected from the group consisting of ammonia and the amines at a temperature of approximately room temperature to approximately 75° C., precipitating in a dilute aqueous mineral acid and subsequently treating the product formed with acetic anhydride.

2. A method of preparing a resin which comprises reacting, in an inert organic solvent, upon a styrene-maleic anhydride resin with a base selected from the group consisting of ammonia and the amines at a temperature of approximately room temperature to approximately 75° C., precipitating in a dilute mineral acid and subsequently treating the product formed with acetic anhydride.

3. A method of preparing a resin which comprises reacting, in an inert organic solvent, upon a synthetic resin containing as an essential ingredient thereof an organic acid anhydride of an $\alpha\beta$-unsaturated dicarboxylic acid, with aniline, at a temperature of approximately room temperature to approximately 75° C., precipitating in dilute aqueous mineral acid and subsequently treating the product formed with acetic anhydride.

4. A method of preparing a resin which comprises reacting, in an inert organic solvent, upon a synthetic resin containing as an essential ingredient thereof an organic acid anhydride of an $\alpha\beta$-unsaturated dicarboxylic acid, with a base selected from the group consisting of ammonia and the amines, at a temperature of approximately room temperature to approximately 75° C. and precipitating the product in dilute aqueous mineral acid.

WENDELL H. McDOWELL.
WILLIAM O. KENYON.